Oct. 19, 1937.  R. P. KOEHRING  2,096,252
METHOD OF MAKING A BEARING MATERIAL
Original Filed Feb. 19, 1934

INVENTOR
Roland P. Koehring
BY
Spencer Hardman & Fehr
HIS ATTORNEYS

Patented Oct. 19, 1937

2,096,252

UNITED STATES PATENT OFFICE 2,096,252

METHOD OF MAKING A BEARING MATERIAL

Roland P. Koehring, Dayton, Ohio, assignor to General Motors Corporation, Detroit, Mich., a corporation of Delaware Application February 19, 1934, Serial No. 711,887
Renewed March 16, 1937

5 Claims. (Cl. 75—22)

This invention relates to metallic bearings and the method of making same.

An object of this invention is to provide a bearing structure having a relatively hard finely porous metal network comprising copper or a copper alloy, and metallic lead filling the fine intercommunicating voids or pores in the network.

Porous bronze bearings having their pores or intercommunicating voids filled with oil or grease are well-known and in wide use at the present time. Such bearings are made by first briquetting metal powders under high pressure and then sintering in a non-oxidizing atmosphere until the lower melting ingredient powder, such as tin, fuses or partially fuses and alloys with the copper ingredient to form a rigid porous structure.

Many attempts have been made to provide such a porous bronze structure with a considerable percentage of lead uniformly distributed therein in order to provide a softer more yieldable bearing and one which is more readily machinable. In making bearings from powdered metals containing lead powder in appreciable quantities, a difficulty experienced is that during sintering of the briquetted article the fused lead will separate from the other ingredients and will ooze or sweat out in the form of globules on the outer surface of the sintered briquette, or will settle by gravity toward the bottom of the briquette. The final result in both cases is that the lead does not remain uniformly distributed throughout the sintered bronze article.

Another difficulty, occurring when lead powder is mixed directly with and briquetted with the remaining ingredients, is that finely divided lead powder readily oxidizes when exposed to air and hence only the coarse grades of lead powder which do not oxidize so readily can be used in that process. This introduces the further objection that the coarse lead powder results in a coarse structure of the finished bearing.

By the method of this invention I have found that lead can be introduced into a porous metal structure resulting in a very fine and uniform distribution of the lead throughout the bearing structure.

Further objects and advantages of the present invention will be apparent from the following description, reference being had to the accompanying drawing, wherein a preferred embodiment of the present invention is clearly shown.

In the drawing.

Similar reference characters refer to similar parts throughout the several views.

Figure 1:
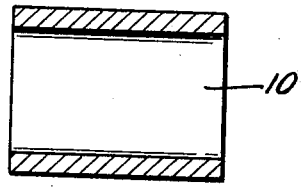
Figs. 1 and 2 are sectional and end elevational views of a bearing bushing made according to this invention.
Figure 2:
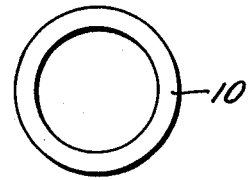
Figure 3:
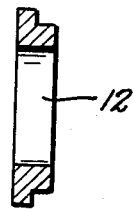
Figs. 3 and 4 are sectional and end elevational views of a seal ring bearing for providing a leakproof seal around a shaft, such as commonly used in electric refrigerator compressors where the seal must be as perfect as possible.
Figure 4:
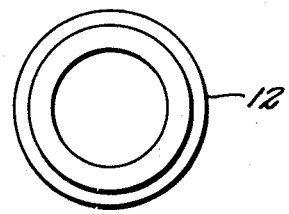

In carrying out this invention no lead is mixed with the initial ingredients which are briquetted under high pressure in a well-known manner to the desired form, which may be a bushing 10 or seal ring 12, as illustrated in the drawing. The briquetted article is sintered in a nonoxidizing atmosphere to form a rigid porous structure having very uniformly distributed fine interconnecting voids therein. A number of these sintered porous articles are then set in a metal pan or other container together with a sufficient quantity of pure lead (which need not be in powdered form) to fill the voids in all the articles in the pan and then the pan and contents are reheated to a temperature well above the melting point of lead in a suitable furnace in a reducing atmosphere. During such reheating the lead thoroughly melts while the porous articles, having a much higher melting point, are not changed in form but the surrounding reducing gases enter the pores thereof and drive out the air and reduce any metallic oxides which may have formed within the pores. The molten lead is then readily absorbed by capillarity into the porous structure until all the communicating voids are filled with lead in a manner similar to a sponge soaking up water placed in contact therewith. The porous structure may be of pure copper or an alloy high in copper content such as bronze or brass. The articles are then removed from the furnace and cooled, and if desired they may be easily machined, broached or pressed in a die to exact finished dimensions.

An important feature of this method over any method wherein the lead is mixed and briquetted with the initial ingredients to form a leaded copper or leaded bronze structure is that there is no chance for any segregation of the lead. The copper or bronze network structure is first produced and fixed and it never subsequently reaches a stage where this network structure can be altered since the molten lead is absorbed into the porous structure far below any temperature which will change the initially formed porous structure.

By this method the amount of lead that can be introduced into a copper or bronze network is controlled by the porosity of the network, which in turn is controlled by the density to which the briquetted powder is first compressed. I have made bearings by this method having up to 50% of lead uniformly distributed throughout a copper network or matrix.

Figure 5:
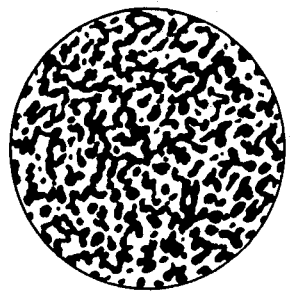
Fig. 5 illustrates the micro-structure of the bearing material of this invention containing 76% copper or bronze and 23% lead when magnified one-hundred times. The white portions of the view represent the copper or bronze network and the black portions represent the lead uniformly distributed therethrough.

As a specific example illustrating the method of this invention the following is given:

A briquette of pure copper powder was compressed at a pressure of about 20,000 lbs. per square inch which gave a briquette of fairly low density and a high degree of porosity. This briquette was then sintered at 1500° F. for 8 minutes in a reducing atmosphere consisting of flue gas having about 1% CO, 11% $CO_2$ and 1% hydrogen. This resulted in a strong porous article of pure copper. The next step consisted in reheating this porous copper article in contact with a predetermined amount of lead in a still more reducing atmosphere of about 7% CO, 7% $CO_2$ and 7% hydrogen until the lead was fully melted and thereupon absorbed into the porous copper structure to substantially fill all the voids therein. The resulting microstructure is shown in Fig. 5.

The porous copper or bronze structure may be immersed in molten lead if desired, however it is only necessary that the molten lead come into contact with the porous structure since it will be readily absorbed or soaked up by capillarity and consequently there will be no tendency for the lead to subsequently separate out by gravity when in the liquid state.

The amount of lead necessary to completely fill all the pores may be predetermined and only that amount of lead used in the process, and hence there will be little or no excess lead left sticking to the outside of the article as it comes from the furnace. If the pores are substantially completely filled with lead the resulting bearing of course is not porous in the sense that it may be impregnated with oil or other lubricant. If desired, less lead may be used than required to completely fill the pores in the network structure, in which case the resulting article will be partially porous and hence may be more readily compressed to the exact finished dimensions by dies or broaches.

While the embodiment of the present invention as herein disclosed, constitutes a preferred form, it is to be understood that other forms might be adopted, all coming within the scope of the claims which follow.

What is claimed is as follows:

1. The process of making a copper-lead bearing, comprising: briquetting finely divided copper powder into the desired shape of bearing, sintering the briquetted bearing in a non-oxidizing atmosphere at such a temperature and for such a time as will cause the metal particles to fuse together and form a strong rigid continuous metal porous network with intercommunicating voids, then heating the sintered bearing in contact with lead in a reducing atmosphere to a temperature well above the melting point of lead but well below the melting point of the metal network to cause the molten lead to enter and substantially fill the voids in the porous metal network by wetting the wall surfaces of said voids and without alloying with said metal network.

2. The steps in the method of making an antifriction bearing containing a high percentage of copper and lead, comprising: briquetting finely divided copper or bronze-forming metal powders into a briquette, sintering the briquette in a non-oxidizing atmosphere at such a temperature and for such a time as will cause the metal particles to fuse together and form a strong continuous porous metal network having substantially uniformly distributed intercommunicating voids therein, then heating the porous metal network in contact with molten lead in a reducing atmosphere at a temperature well above the melting point of lead but below the melting point of the metal network and thereby causing the molten lead to enter said intercommunicating voids by a wetting adherence to the wall surfaces of said voids, then cooling the network with the lead contained within the voids thereof.

3. The steps in the method of making a bearing material comprising: briquetting finely divided copper or bronze forming metal powders into a briquette, sintering the briquette and thereby causing the metal particles to fuse or alloy together and form a strong rigid porous metal network having substantially uniformly distributed intercommunicating voids throughout its mass, then reheating this porous metal network in a reducing atmosphere but having some portion thereof in contact with molten lead and at a temperature well above the melting point of lead but below the fusion point of said network and thereby causing the molten lead to enter and adhere within said intercommunicating voids by capillarity action, then cooling the porous network with the lead contained within the voids thereof.

4. The steps in the method of making a composite bearing material containing a high percentage of copper and lead, comprising: sintering finely divided copper powder in a non-oxidizing atmosphere at such a temperature and for such a time as will cause the copper particles to sinter or bond together at their contacting surfaces and form a continuous porous copper network having substantially uniformly distributed intercommunicating voids therein, subsequently heating the porous copper network in contact with molten lead in a reducing atmosphere at a temperature above the melting point of lead but below such high temperature as will change the form of the porous network and thereby causing the molten lead to soak into the intercommunicating voids by a wetting adherence to the wall surfaces of said voids, then cooling the porous copper network and thereby solidifying the molten lead retained within said voids.

5. The steps in the method of making a composite bearing material containing a high percentage of copper and lead, comprising: providing a porous copper network having substantially uniformly distributed fine intercommunicating voids therein, heating said porous copper network in contact with molten lead in a reducing atmosphere at a temperature above the melting point of lead but below such high temperature as will change the form of the porous copper network and thereby causing the molten lead to soak into the porous copper by capillarity action and substantially fill said voids, then cooling the porous copper network and thereby solidifying the molten lead retained within said voids.

ROLAND P. KOEHRING.